No. 894,274. PATENTED JULY 28, 1908.
T. E. LOCKWOOD.
EDUCATIONAL TOY.
APPLICATION FILED SEPT. 14, 1905.

WITNESSES:
Clarence L. Perdew
Ellie M. Simon.

INVENTOR
Thomas E. Lockwood
BY James N. Ramsey
ATTORNEY.

UNITED STATES PATENT OFFICE.

THOMAS E. LOCKWOOD, OF MILFORD, OHIO.

EDUCATIONAL TOY.

No. 894,274.   Specification of Letters Patent.   Patented July 28, 1908.

Application filed September 14, 1905. Serial No. 278,444.

*To all whom it may concern:*

Be it known that I, THOMAS E. LOCKWOOD, a citizen of the United States, residing at Milford, in the county of Clermont and State of Ohio, have invented certain new and useful Improvements in Educational Toys, of which the following is a specification.

My invention relates to educational toys, the object being to provide a simple device for the purpose of instruction and amusement.

My invention consists in a device comprising a series of members rotatable with respect to each other and bearing upon their surfaces markings or characters, and means for rotating any one of said members whereby different combinations of said markings or characters may be obtained.

My invention also consists in the construction and arrangement of parts as set forth and claimed.

Figure 1:
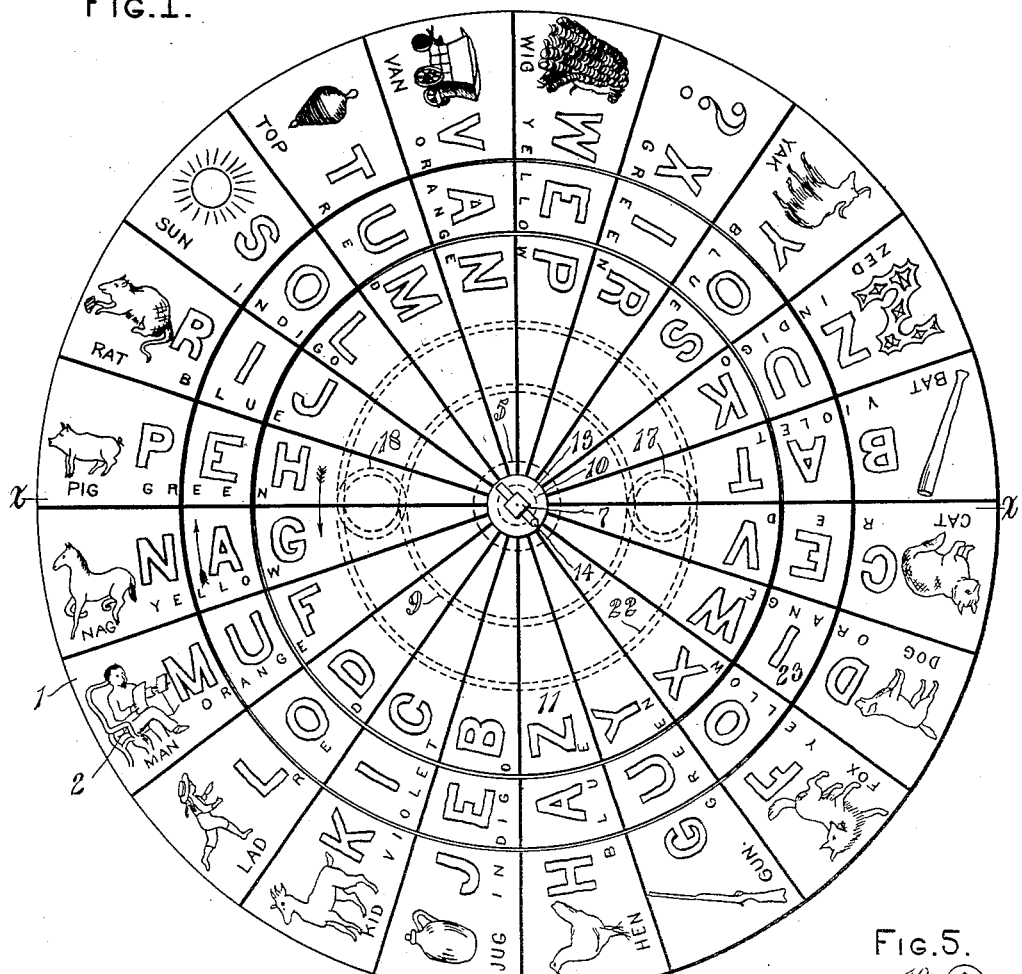
Figure 5:
Figure 2:
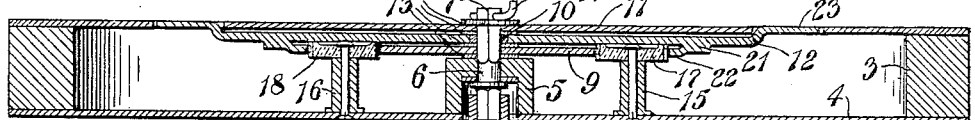
Figure 3:
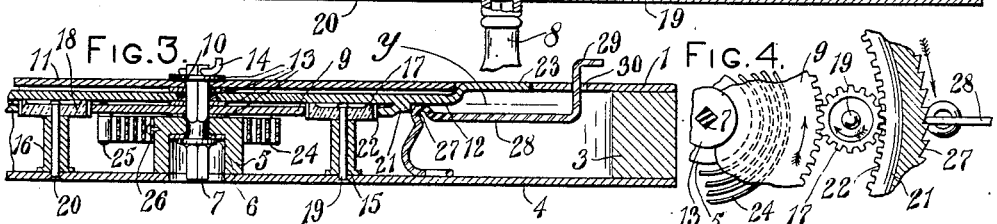
Figure 4:
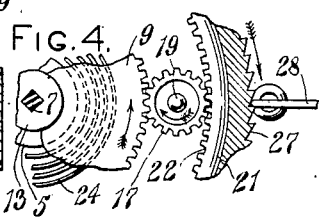

In the drawings: Figure 1 is a plan view of my invention illustrating how it is adapted for teaching spelling. Fig. 2 is a section on the line $x$—$x$ of Fig. 1. Fig. 3 is a partial section of a modification of my invention on a line corresponding to $x$—$x$ of Fig. 1. Fig. 4 is a partial horizontal section on a line corresponding to the line $y$ of Fig. 3. Fig. 5 is a detail plan view of a washer.

For the purpose of illustrating my invention I have shown a stationary ring 1 bearing pictures of familiar objects upon its surface as at 2 and supported by means of the ring or casing 3 upon the base 4. Centrally located upon the base 4 in alinement with an opening therein, is provided the bearing block 5 in which is journaled at 6 the vertical shaft 7. Preferably the lower part of the shaft 7 is rectangular in shape and is provided with a suitable key 8 only part of which is shown herein. The part of the shaft 7 above the journal 6 is also rectangular in shape and the gear 9, washer 10 and inner disk 11 have centrally disposed openings adapted to receive the rectangular portion of the shaft 7 and to be rotated therewith. The outer disk 12 has a centrally disposed circular opening adapting it to fit closely around the washer 10 and to rotate thereon. The washer 10 is shown in detail in Fig. 5. Other washers 13 larger than the washer 10 are placed adjacent the disks to form suitable bearings therefor. To facilitate the removal and replacing of the disks when necessary, I prefer to form an opening in the upper portion of the shaft 7 above the adjacent washer 13 and to insert a pin 14 therein for holding the disks and washers in position on the shaft 7. Supported upon the standards 15 and 16 are the pinions 17 and 18 held in place by and rotatable about the pins 19 and 20 and meshing with the gear 9 at opposite sides thereof. The outer disk 12 is provided with the annular downward extension 21 having internal gear teeth 22 in mesh with the pinion 17. The inner disk 11 is somewhat less in diameter than the aperture in the stationary ring 1 and the outer disk 12 has the annular upward extension 23 nearly filling the space thus formed and presenting its upper face on a plane with the upper face of the stationary ring 1 and the inner disk 11.

As I have herein illustrated my invention the stationary ring 1 bears a series of consonants each of which is an initial of the name of a familiar object pictured on the ring adjacent said initial. The outer disk bears a corresponding number of vowels and the inner disk bears a corresponding number of consonants. Radial lines are drawn between the various pictures and names and the segments thus formed are each given a color imitating a color of the rainbow. When the shaft 7 is rotated the inner disk 11 will revolve with it as will also the gear 9 causing the pinions 17 and 18 to revolve the outer disk 12 in an opposite direction, and, since the ring 1 is stationary, there will be a constant change of combinations between the letters and colors upon the faces of the disks and ring, thereby spelling different words and blending the colors to produce varied effects. Preferably the upper rectangular portion of the shaft 7 is so formed that the key 8 may be used upon either end of the shaft adding to the convenience of the device.

When it is desired to produce rapid rotation of the disks a coil spring 24 will be found useful. This spring may be applied in any suitable manner, but I have here illustrated a manner of applying it by which the disks will be rotated while the spring is being wound up as well as when it is running down. One end of the spring is attached to the gear 9 as at 25 near its periphery, and the other end is attached to the bearing block 5 at 26, and the outer edge of the extension 21 on the outer disk 12 is provided with ratchet teeth 27 which are engaged by the pawl 28. After the spring has been wound to a sufficient tension the pawl 28 may be disengaged from the ratchet teeth 27 by pressing downwardly on the portion 29 of the pawl extending through an opening 30 in the stationary ring 1, when the inner and outer disks will be rapidly revolved in opposite directions until the spring 24 has been unwound.

As the outer and inner disks may be conveniently removed and replaced the outer disk may be made to mesh with the pinions 17 and 18 at any desired point thereby allowing a new series of combinations to be formed for each change thus effected.

It will be apparent that my invention is capable of considerable modification without material departure from the scope or spirit thereof, as for instance, the number of disks used may be varied as desired.

While my invention is particularly useful in teaching spelling and producing color effects it is readily adaptable to other forms of instruction and amusement by providing suitable markings or characters thereon. Therefore while I have shown and described the specific construction herein I do not wish to be understood as limiting myself to it, but

What I claim as new and desire to secure by Letters Patent is:

1. In an educational toy, a ring, a bearing attached to said ring, an inner disk journaled therein, an outer disk journaled concentric to said inner disk and said ring, markings on said ring and on said inner and outer disks, and means for engagement between said inner disk and said outer disk whereby they are simultaneously rotated with respect to each other in opposite directions to produce different combinations of said markings.

2. In an educational toy, a stationary ring, a bearing attached to said ring, an inner disk journaled therein of less diameter than the aperture in said stationary ring, an outer disk journaled concentric to and having a portion of its surface exposed between said stationary ring and said inner disk, markings upon the portion of its surface thus exposed, markings upon said stationary ring and said inner disk and means for engagement between said inner and said outer disk whereby they are simultaneously rotated with respect to each other in opposite directions to produce different combinations of said markings.

3. In an educational toy, a stationary ring, a bearing attached to said ring, an inner disk journaled therein of less diameter than the aperture in said stationary ring, an outer disk journaled concentric to and having a portion of its surface exposed between said stationary ring and said inner disk, markings upon the portion of its surface thus exposed, markings upon said stationary ring and said inner disk, gear teeth attached to said inner disk and adapted to rotate therewith, a pinion in mesh with said gear teeth, and gear teeth on said outer disk in mesh with said pinion.

4. In an educational toy, a disk, radially disposed markings thereon, a second disk, markings thereon, a spring adapted to rotate one of said disks and means for engagement between said disks whereby the exposed parts of said disks are rotated with respect to each other in the same horizontal plane simultaneously in opposite directions to form different combinations of said markings.

5. In an educational toy, a stationary ring, a bearing attached to said ring, an inner disk journaled therein of less diameter than the aperture in said stationary ring, an outer disk journaled concentric to and having a portion of its surface exposed between said stationary ring and said inner disk, markings upon the portion of its surface thus exposed, markings upon said inner ring and said inner disk, gear teeth attached to said inner disk and adapted to rotate therewith, a spring adapted to rotate said gear teeth, a pinion in mesh with said gear teeth, gear teeth on said outer disk in mesh with said pinion, and means for controlling the rotation of said disks.

THOMAS E. LOCKWOOD.

Witnesses:
JAMES N. RAMSEY,
CLARENCE L. PERDEW.